(12) United States Patent
Wong

(10) Patent No.: US 8,219,575 B2
(45) Date of Patent: Jul. 10, 2012

(54) METHOD AND SYSTEM FOR SPECIFYING, PREPARING AND USING PARAMETERIZED DATABASE QUERIES

(75) Inventor: Joseph Wong, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 55 days.

(21) Appl. No.: 12/945,739

(22) Filed: Nov. 12, 2010

(65) Prior Publication Data

US 2012/0124063 A1 May 17, 2012

(51) Int. Cl.
*G06F 7/00* (2006.01)
*G06F 17/30* (2006.01)
(52) U.S. Cl. .................................. 707/759; 707/713
(58) Field of Classification Search .............. 707/759, 707/713
See application file for complete search history.

(56) References Cited

U.S. PATENT DOCUMENTS

| | | | |
|---|---|---|---|
| 7,100,167 B2* | 8/2006 | Novik et al. | 719/318 |
| 7,218,613 B1* | 5/2007 | Doskow et al. | 370/252 |
| 7,251,776 B2* | 7/2007 | Handsaker et al. | 715/212 |
| 7,483,879 B2* | 1/2009 | Chang et al. | 1/1 |
| 7,640,235 B2* | 12/2009 | Shulman et al. | 1/1 |
| 7,653,913 B2* | 1/2010 | Novik et al. | 719/318 |
| 7,779,386 B2* | 8/2010 | Seitz et al. | 717/108 |
| 7,958,113 B2* | 6/2011 | Fan et al. | 707/718 |
| 7,987,178 B2* | 7/2011 | Hueske et al. | 707/713 |
| 8,082,322 B1* | 12/2011 | Pascarella et al. | 709/218 |
| 8,087,092 B2* | 12/2011 | Richardson et al. | 726/33 |
| 2006/0224563 A1 | 10/2006 | Hanson et al. | |

FOREIGN PATENT DOCUMENTS

EP 1585036 A2 10/2005

OTHER PUBLICATIONS

"European Application Serial No. 11007721.1, Search Report mailed Jan. 2, 2012", 9 pgs.
Bisht, Prithvi, et al., "Automatically Preparing Save SQL Queries", Financial Cryptography and Data Security, LNCS 6052, [Online]. Retrieved from the Internet: <URL: http://citeseerx.ist.psu.edu/viewdoc/summary?doi=10.1.1.155.1060>, (2010), 272-288.
Boyd, Stephen W, et al., "SQLrand: Preventing SQL Injection Attacks", Applied Cryptography and Network Security, LCNS 3089, (2004), 292-302.
Hu, Wei, et al., "Secure and Practical Defense Against Code-injection Attacks using Software Dynamic Translation", VEEE, (2006), 14-16.
Keromytis, Angelos D, "Randomized Instruction Sets and Runtime Environments Past Research and Future Directions", IEEE Security and Privacy vol. 7, No. 1, (Jan. 2009), 18-25.
Thomas, Stephen, et al., "On automated prepared statement generation to remove SQL injection vulnerabilities", Information and Software Technology 51, [Online]. Retrieved from the Internet: <URL: http://www.cs.washington.edu/homes/taoxie/publications/ist09-fix.pdf>, (2009), 589-598.

* cited by examiner

*Primary Examiner* — Charles Lu
(74) *Attorney, Agent, or Firm* — Schwegman, Lundberg & Woessner, P.A.

(57) ABSTRACT

A representative parameterized query in a second database query language is generated from a parameterized query in first database query language. By randomly generating a query in the first database query language, translating this query into the second database query language, and then identifying locations of relevant parameters in the translated query, parameter placeholders can then be substituted at the identified locations to provide a parameterized query in the second database query language. A representative parameterized query in the second database query language can be selected by randomly generating multiple parameterized queries and applying statistical methods including Monte Carlo methods.

33 Claims, 8 Drawing Sheets

```
212 ┌─────────────────────────────────────────────────────────────────┐
212A ──  CURRENT_USER — 42
212B ──  CURRENT_ACCESS_KEYS — ["qWe"]
212C ──  ActiveRecord DSL Query —
           Purchase.find(:all, :conditions => {:quantity => 42, :state => "CA", :color => "CA"}
212D ──  random_args = {:c => "CA", :CURRENT_USER => 42, :CURRENT_ACCESS_KEYS => ["qWe"]}
     └─────────────────────────────────────────────────────────────────┘
                                    │
                                    ▼
214 ┌─────────────────────────────────────────────────────────────────┐
214A ──  SELECT * FROM purchases WHERE quantity = 42 AND state = 'CA' AND color = 'CA' AND
         owner_id = 42
214B ──  random_args = {:c => "CA", :CURRENT_USER => 42, :CURRENT_ACCESS_KEYS => ["qWe"]}
     └─────────────────────────────────────────────────────────────────┘
                                    │
                                    ▼
216 ┌─────────────────────────────────────────────────────────────────┐
216A ──  SQL with placeholder =
           SELECT * FROM purchases WHERE quantity = ? AND state = ? AND color = ? AND
           owner_id = ?
216B ──  parameter_order = [:CURRENT_USER, :c, :c, :CURRENT_USER]
     └─────────────────────────────────────────────────────────────────┘
```

Fig. 2C

METHOD AND SYSTEM FOR SPECIFYING, PREPARING AND USING PARAMETERIZED DATABASE QUERIES

BACKGROUND OF THE INVENTION

1. Technical Field

The present disclosure relates generally to database systems and more particularly to operations on database queries in database systems.

2. Description of Related Art

In database operations it is often desirable to use prepared statements that parameterize query search terms in order to avoid the cost of repetitively parsing, compiling and optimizing the same queries over and over again during the course of normal operations. (Stephen Thomas, Laurie Williams, and Tao Xie, "On automated prepared statement generation to remove SQL injection vulnerabilities," Information and Software Technology, Volume 51 Issue 3, March 2009; Prithvi Bisht, A. Prasad Sistla, and V. N. Venkatakrishnan, "Automatically Preparing Safe SQL Queries," 14th Financial Cryptography and Data Security Conference (FC'2010), Canary Islands, Spain, January, 2010.) Additionally, in many operational settings, queries developed on one database query language must later be applied in another database query language. However, when translating prepared statements from a first database query language to a second database query language, both accuracy and security must be taken into account. Current approaches for generating prepared statements may require user interaction to ensure accuracy and maintain security.

Thus, there is a need for improved systems and methods for generating prepared statements that parameterize query search terms.

SUMMARY

Certain embodiments enable improved generation of a representative parameterized query in a second database query language from a parameterized query in first database query language. By randomly generating a query in the first database query language, translating this query into the second database query language, and then identifying locations of relevant parameters in the translated query, parameter placeholders can then be substituted at the identified locations to provide a parameterized query in the second database query language. A representative parameterized query in the second database query language can be selected by randomly generating multiple parameterized queries and applying statistical methods including Monte Carlo methods.

One embodiment relates to a method of operating on database queries. The method includes receiving values that specify a parameterized input query in a first database query language, where the parameterized input query includes one or more parameters that are assigned values to execute the parameterized input query in the first database query language. The method then includes using a computer for determining randomized input queries in the first database query language by substituting a selection of random parameter values for the one or more parameters in the parameterized input query. For each randomized input query a corresponding random-argument list identifies the one or more random parameter values for the one or more parameters. The method then includes determining randomized output queries in the second database query language by translating the randomized input queries in the first database query language into corresponding randomized output queries in the second database query language. For each randomized output query the random-argument list of a corresponding randomized input query identifies the one or more random parameter values for the one or more parameters.

The method then includes determining, from the randomized output queries, filtered output queries in the second database query language by replacing each occurrence of the one or more parameter values in the random-argument lists with a parameter placeholder. For each filtered output query a corresponding parameter-order list identifies a corresponding parameter for each parameter placeholder. The method then includes selecting a representative filtered output query from the filtered output queries by evaluating a likelihood of the representative filtered output query relative to the filtered output queries. The representative filtered output query defines a parameterized output query in the second database query language and its parameter-order list identifies a corresponding one or more parameters that are assigned values to execute the parameterized output query in the second database query language.

Another embodiment relates to an apparatus for carrying out the above-described method, where the apparatus includes a computer for executing instructions related to the method. For example, the computer may include a processor for executing at least some of the instructions. Additionally or alternatively the computer may include circuitry or other specialized hardware for executing at least some of the instructions. Another embodiment relates to a computer-readable medium that stores (e.g., tangibly embodies) a computer program for carrying out the above-described method with a computer. In these ways aspects of the disclosed embodiments enables improved systems and methods for generating prepared statements that parameterize query search terms.

BRIEF DESCRIPTION OF THE DRAWINGS

FIGS. 2A, 2B and 2C are portions of database query code that illustrate an example for the embodiment of FIG. 1.

DETAILED DESCRIPTION OF EXAMPLE EMBODIMENTS

Figure 1:
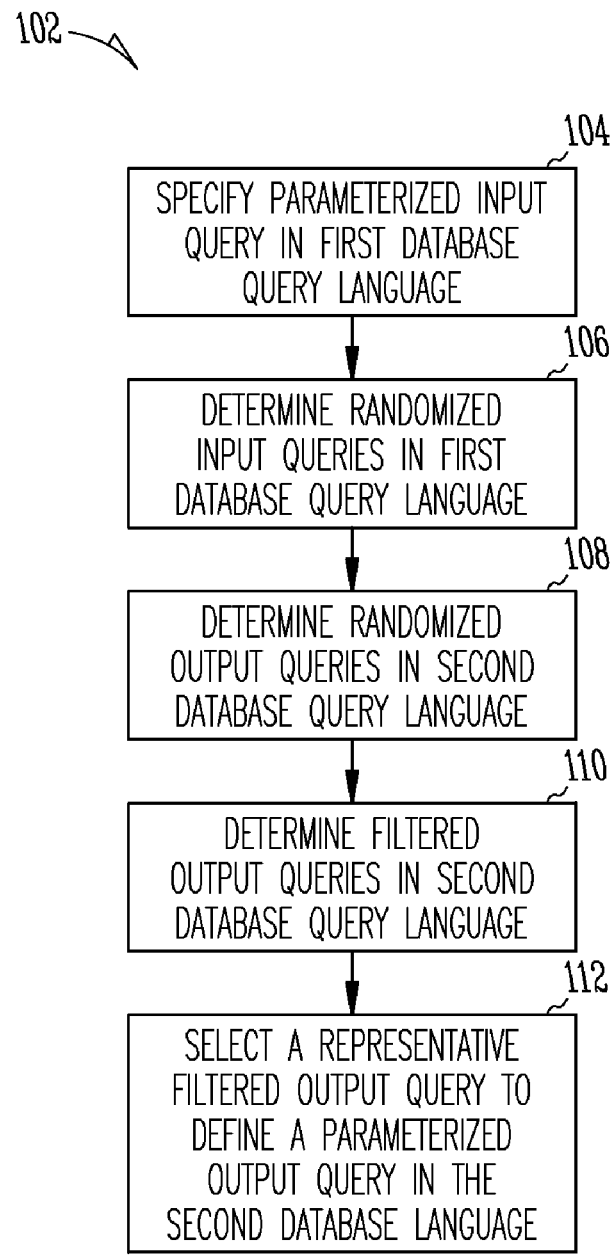
FIG. 1 is a flowchart that shows a method of operating on database queries according to an example embodiment.
Figure 2A:
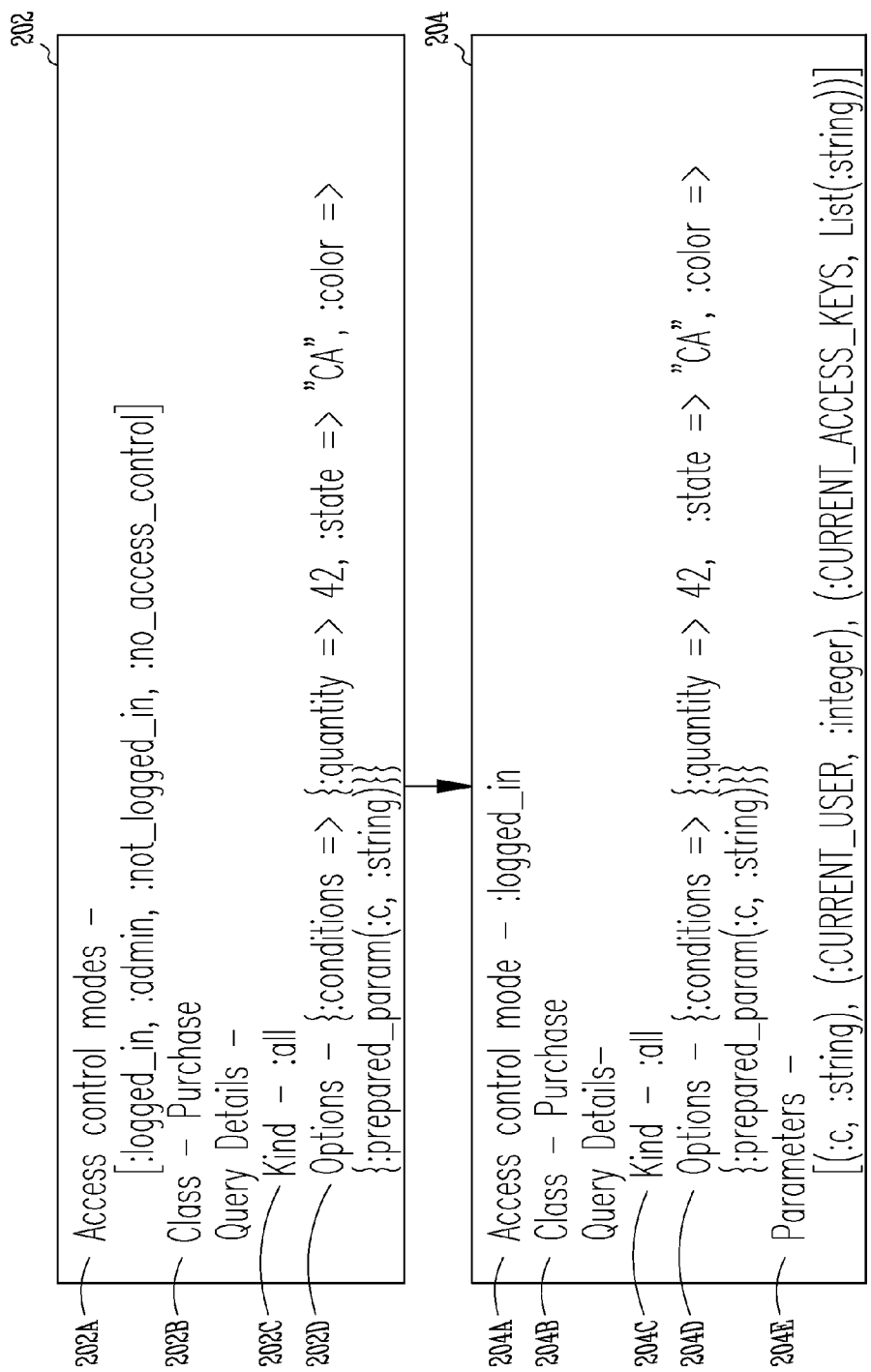
Figure 2B:
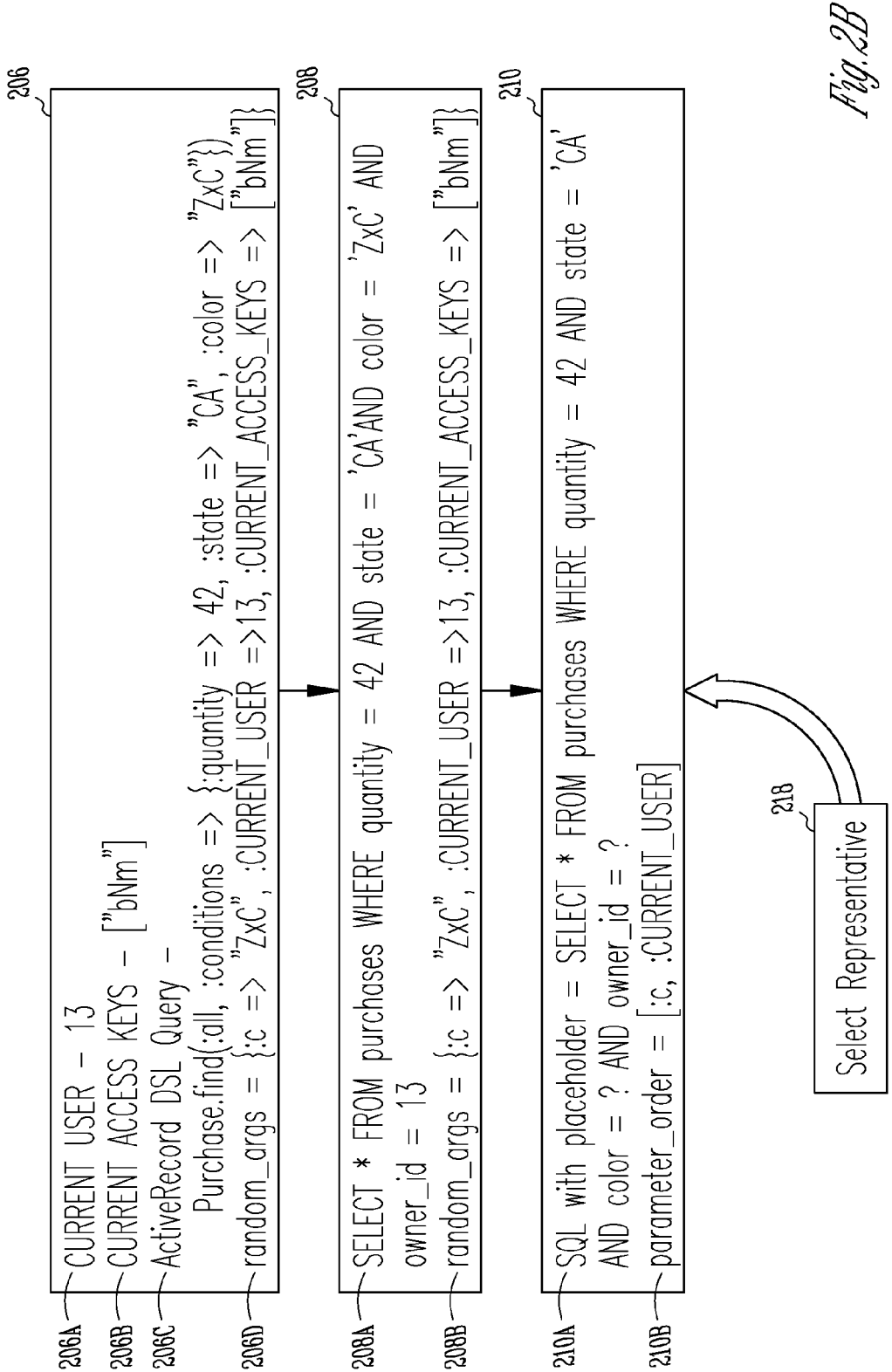

FIG. 1 shows a method 102 of operating on database queries according to an example embodiment, and FIGS. 2A, 2B and 2C show portions of database query code that illustrate this embodiment for a case where the input query is in a Domain Specific Language (DSL) and the desired output is a parameterized query in a Structured Query Language (SQL). Examples of a DSL include extensions of the ActiveRecord query language from the Ruby on Rails framework. In a first operation 104 of the method 102, a parameterized input query in a first database query language is specified, where the parameterized input query includes parameters that are assigned values in order to execute the parameterized input query. A first DSL code portion 202 in FIG. 2A shows a family of input queries for different access control modes 202A including logged_in, admin, not_logged_in, and no_access_control. The class Purchase 202B is an object-oriented classification for the database query. In the query details, the parameter kind 202C is set to all to indicate that all results will be returned, and the query options 202D indicate that quantity is set to 42 (i.e., the number purchased), state is set to CA (i.e., the purchase origin), and "color" is given as a parametric string variable c. (Note that the words first and second and the like are used here and elsewhere for labeling purposes only and are not intended to denote any specific spatial or temporal ordering. Furthermore, the labeling of a first element does not imply the presence a second element.)

The parametric string variable c is a generic parameter for the query options 202D. However, additional parameters may be added depending on the privileges of each access control mode. A second DSL code portion 204 of FIG. 2A shows more specific detail for the input query when the access control mode 204A is specified as logged_in. The class Purchase 204B, the parameter kind 204C, and the query options 204D are carried over from the first DSL code portion 202. In this case, the parameters 204E that are assigned values in order to execute a query search in the first database query language (DSL) include the generic parameter c and additional parameters CURRENT_USER (e.g. a user ID) and CURRENT_ACCESS_KEYS (e.g., strings that relate to user privileges). These additional parameters may vary depending on the access control mode. For example, when the access control mode is specified as not_logged_in, the parameter list typically includes only the generic parameter c. The subsequent discussion focuses on the input query for access control mode logged_in as specified by the second DSL code portion 204.

In a second operation 106, randomized input queries in the first database query language are determined by substituting a selection of random parameter values for the parameters in the parameterized input query. For each randomized input query a corresponding random-argument list identifies the random parameter values for the parameters. For example in FIG. 2B a first code portion 206 shows CURRENT_USER 206A, CURRENT_ACCESS_KEYS 206B, a randomized DSL input query 206C, and a random argument list 206D that identifies values for the parameters: "ZxC" for c, "13" for CURRENT_USER, and "bNm" for CURRENT_ACCESS_KEYS. Conventional random number generators can be used to generate these values. For example, upper and lower bounds may be specified for string lengths and integer values. Then, in the case of a string variable, the string length may be randomly chosen first (e.g., length 3 for string c) and then the string value may be randomly chosen.

In a third operation 108, randomized output queries are determined in the second database query language by translating the randomized input queries in the first database query language into corresponding randomized output queries in the second database query language. This translation can be done by standard methods for generating statements in a second database query language (e.g., SQL) from a given query in a first database query language (e.g., DSL). For each randomized output query the random-argument list of the corresponding randomized input query similarly identifies the random parameter values for the parameters. A second code portion 208 of FIG. 2B shows a randomized SQL output query 208A and random argument list 208B in correspondence to the randomized DSL input query 206C and random argument list 206D.

In a fourth operation 110, filtered output queries in the second database query language are determined from the randomized output queries by replacing each occurrence of the parameter values in the random-argument lists with a parameter placeholder. For each filtered output query a corresponding parameter-order list identifies a corresponding parameter for each parameter placeholder. A third code portion 210 of FIG. 2B shows an SQL filtered output query 210A and a parameter-order list 210B. In the SQL filtered output query 210A, the parameter placeholder "?" has been substituted for the parameter value "ZxC" and the parameter value "13." The parameter-order list 210B identifies the corresponding parameters by order of substitution (i.e., c for "ZxC" and CURRENT_USER for "13"). Note that in alternative embodiments, the parameter placeholder may be another arbitrary character or a sequence of arbitrary characters.

The SQL filtered output query 210A corresponds to a desirable translation from the DSL input query specified by the second DSL code portion 204 in that a parameter placeholder "?" has been correctly substituted for the parameters c and CURRENT_USER. However, randomization allows for pathological outcomes. FIG. 2C shows code portions similar to FIG. 2B where the random parameter values have effectively collided with unrelated strings in the DSL input query specified by the second DSL code portion 204. The first code portion 212 of FIG. 2C shows CURRENT_USER 212A, CURRENT_ACCESS_KEYS 212B, a randomized DSL input query 212C, and a random argument list 212D that identifies values for the parameters: "CA" for c, "42" for CURRENT_USER, and "qWe" for CURRENT_ACCESS_KEYS. Comparing the first code portion 212 of FIG. 2C with the first code portion 206 of FIG. 2B, one sees that the random parameter value for c is "CA", a value that collides with the specified state, and the random parameter value for CURRENT_USER is "42", a value that collides with the specified quantity. The second code portion 214 shows a corresponding randomized SQL output query 214A and random argument list 214B in correspondence to the randomized DSL input query 212C and random argument list 212D. In this case the randomized output query 214A has the duplicate entries for "CA" and "42". The third code portion 216 show an SQL filtered output query 216A, where the parameter placeholder "?" has been substituted for the parameter value "CA" and the parameter value "42." The parameter-order list 216B identifies the corresponding parameters by order of substitution (i.e., CURRENT_USER for "42", c for "CA", c for "CA" and CURRENT_USER for "42"). As compared with the SQL filtered output query 210A in FIG. 2B, this result is undesirable because the parameter placeholder "?" has been incorrectly substituted.

Randomizing methods (e.g., Monte Carlo methods) typically rely on calculating a sufficient number of simulated results so that an average result or the majority of the results provides an acceptable answer. In this example, one expects that over multiple simulations, the first SQL filtered output query 210A will be repeated many times while the second SQL filtered output query 216A will not be significantly repeated. By carrying out multiple simulations, the preferred answer can be identified through its duplication.

Thus, in a fifth operation 112 a representative filtered output query is selected from the filtered output queries by evaluating a likelihood of the representative filtered output query relative to the filtered output queries. For example, after many simulations that each generate a new set of random parameter values 206, 212, the most probable SQL filtered output query 210A will be repeated a threshold number of times relative to the all the SQL filtered output queries 210A, 216A. This repetition can be monitored by keeping a count of each unique SQL filtered output query including its corresponding parameter-order list 210B, 216B. Then a representative filtered output query can be selected 218 as shown in FIG. 2B when a threshold number (e.g., 75%) of the filtered output queries correspond to the representative filtered output query 210A. The representative filtered output query 210A then defines a parameterized output query in the second database query language, where its parameter-order list identifies the corresponding parameters that are assigned values to execute the parameterized output query in the second database query language (SQL). In this example, the original DSL parameterized input query specified by the second DSL code portion 204 includes three distinct parameters (c, CURRENT_USER, and CURRENT_ACCESS_KEYS), but the SQL parameterized output query 210A includes just two distinct parameters (c, and CURRENT_USER) since not all parameters from the parameterized input query were relevant to resulting parameterized output query 210A.

Depending on the operational setting, each combination that includes a randomized input query 206C, a randomized output query 208A and a filtered randomized output query 210A can be determined together rather than determining all the randomized input queries first and then proceeding to determine all the randomized output queries and then proceeding to determine all the filtered randomized output queries. Then the threshold test (e.g., 75%) can be carried out as each new combination is determined after first determining a minimal number of combinations.

Figure 3:
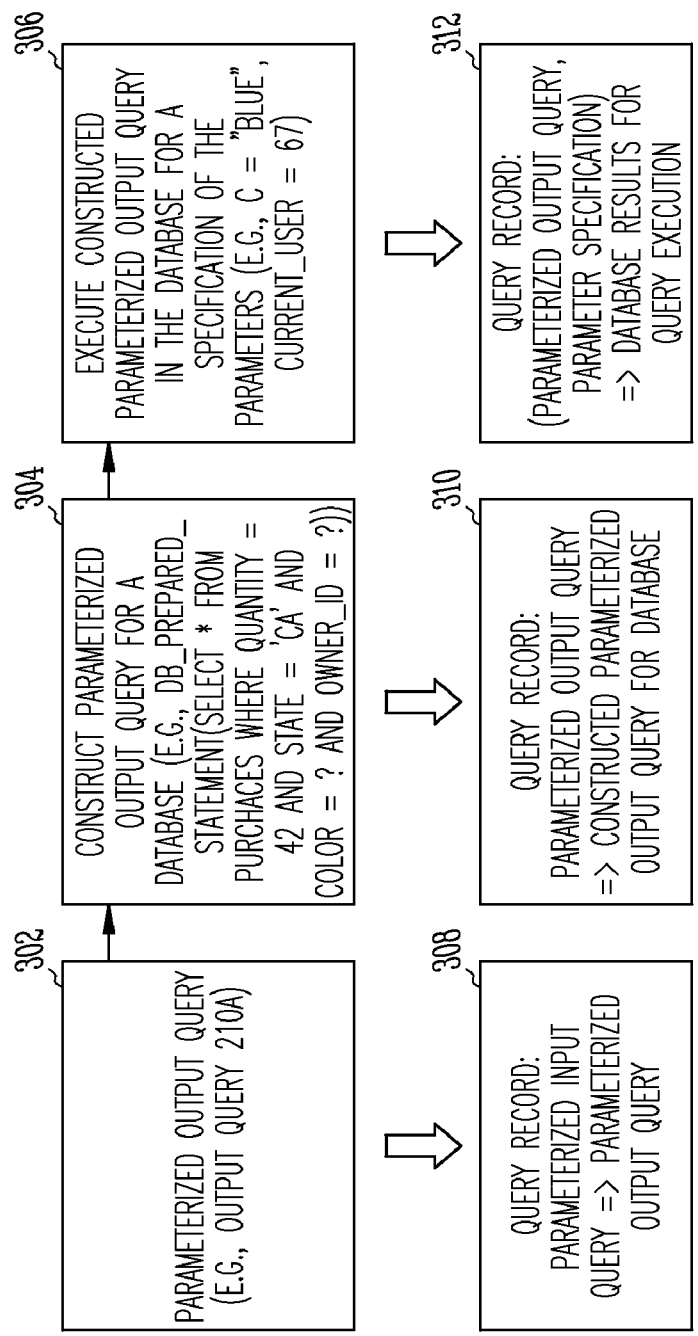
FIG. 3 is a flowchart that shows further operations including caching for the embodiment of FIG. 1.

Once a parameterized query has been determined, related query searches can be executed in the second database query language. FIG. 3 shows further related operations including database caching for the embodiment of FIG. 1. Beginning with a parameterized input query one can construct 302 the parameterized query for the formatting of a specific database 304. The construction 302 begins with an input query (e.g., the first DSL code portion 202, the parameterized input query 204A of FIG. 2A) to create the parameterized query (e.g., the SQL parameterized output query 210A of FIG. 2B). If the parameterized query is in a query record 308 (also known as a cache entry) then retrieve it. Else, create the parameterized query from the input query. Then, the constructed parameterized query can be executed for a specification of the parameters by replacing the parameter placeholder "?" with specific values (e.g., c="blue", CURRENT_USER=67) 306. At each of these stages, caching can be employed to facilitate process when a similar query is subsequently executed. In a first example embodiment, a query record 308 is saved in a cache, where this query record 308 relates the parameterized input query 204A of FIG. 2A to the parameterized output query 210A. In a second example embodiment, a query record 310 is saved in a cache, where this query record 310 relates the parameterized query 210A to the constructed parameterized query for the database. In a third example embodiment, a query record 312 is saved in a cache, where this query record 312 relates the parameterized query 210A and the parameter specification (e.g., c="blue", CURRENT_USER=67) to the database results for the query when executed 306.

Figure 4:
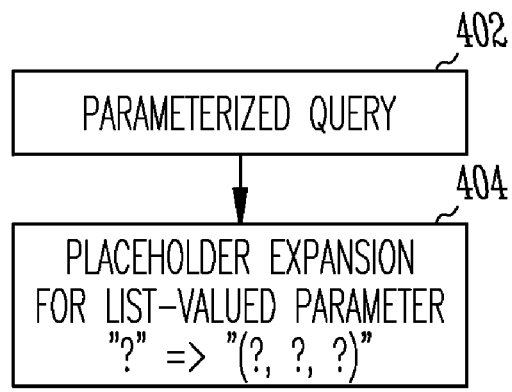
FIG. 4 is a flowchart that shows parameter expansion for an example embodiment.

In some operational settings a parameter placeholder may require a further expansion before replacing the parameter placeholders with specific parameter values. FIG. 4 shows parameter expansion for an example embodiment. In this case the parameterized query 402 includes a parameter placeholder "?" that refers to list-valued parameter (e.g., an ordered set of parameters). A placeholder expansion 404 accommodates the list-valued parameter by substituting a multi-valued placeholder "(?, ?, ?)" for the original placeholder "?".

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII). In some contexts, the computer-readable medium may be alternatively described as a computer-useable medium, a computer-storage medium, a computer-program medium, machine-readable medium or some alternative non-transitory storage medium. Depending on the on the operational setting, specified values for the above-described methods may correspond to input files for the computer program or computer.

Figure 5:
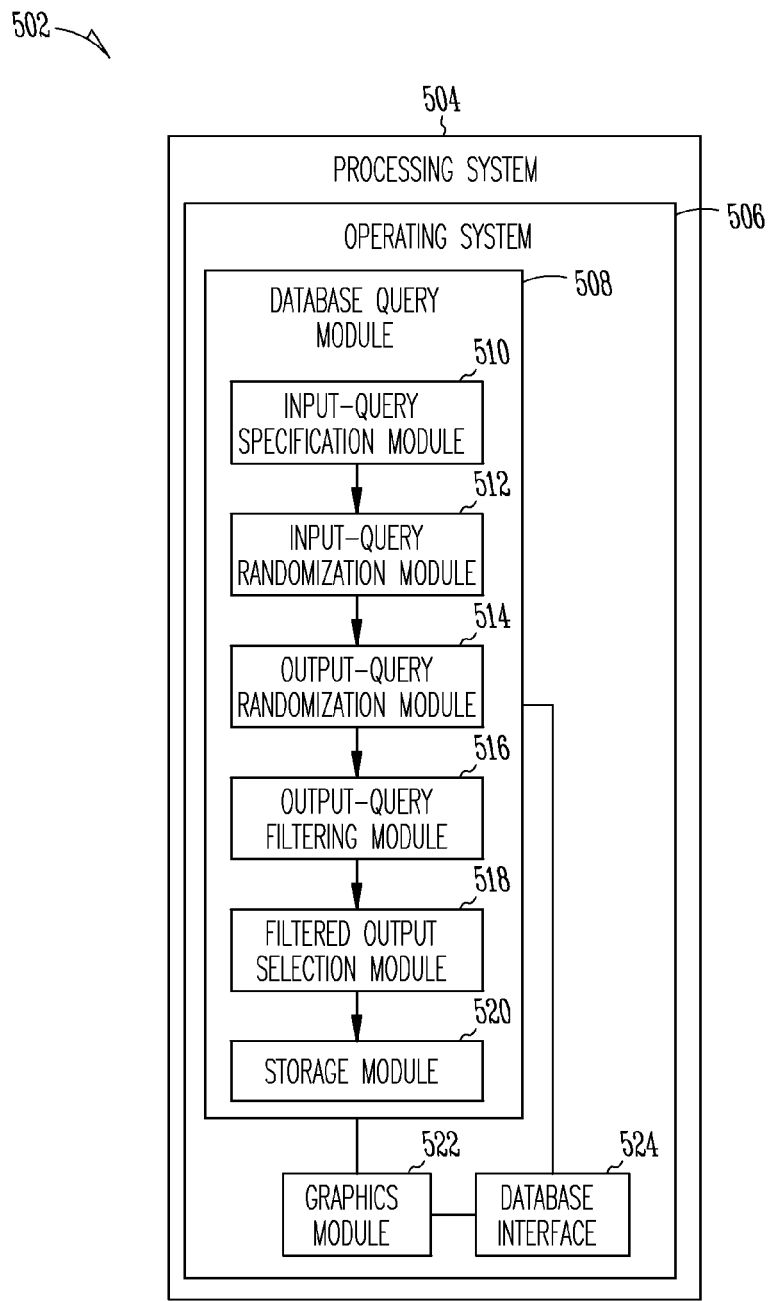
FIG. 5 is a schematic representation of an apparatus that operates on database queries, in accordance with an example embodiment.

FIG. 5 shows a schematic representation of an apparatus 502 that operates on database queries in accordance with an example embodiment. For example, the apparatus 502 may be used to implement the method 102 shown in FIG. 1 of operating on database queries as described above. The apparatus 502 is shown to include a processing system 504 that may be implemented on a server, client, or other processing device that includes an operating system 506 for executing software instructions.

In accordance with an example embodiment, the apparatus 502 includes a database-query module 508 that includes an input-query specification module 510, an input-query randomization module 512, an output-query randomization module 514, an output-query filtering module 516, a filtered-output selection module 518, and a storage module 520.

The input-query specification module 510 operates to receive values that specify an input query in the first database query language, where the input query includes parameters that are assigned values to execute a query search in the first database query language. The input-query randomization module 512 operates to determine randomized input queries in the first database query language by substituting a selection of random parameter values for the parameters in the input query. For each randomized input query a corresponding random-argument list identifies the random parameter values for the parameters. The output-query randomization module 514 operates to determine randomized output queries in the second database query language by translating the randomized input queries in the first database query language into corresponding randomized output queries in the second database query language. For each randomized output query the random-argument list of the corresponding randomized input query identifies the random parameter values for the parameters. The output-query filtering module 516 operates to determine, from the randomized output queries, filtered output queries in the second database query language by replacing each occurrence of the parameter values in the corresponding argument list with a parameter placeholder. For each filtered output query a corresponding parameter-order list identifies a corresponding parameter for each parameter placeholder. The filtered-output selection module 518 operates to select a representative filtered output query from the filtered output queries by evaluating a likelihood of the representative filtered output query relative to the filtered output queries. The representative filtered output query defines a parameterized query in the second database query language and its parameter-order list identifies corresponding parameters that are assigned values to execute a query search in the second database query language. The storage module 520 operates to store related data including the parameterized query.

In addition, a graphics module 522 operates to render images on the display screen and a database interface 524 operates to enable access to remote data storage. The database interface 524 may provide database management functionality including a database application, a database management system (DBMS), one or more databases (local and/or remote), input/output (I/O) buffer caches, and the like. The database application may provide order fulfillment, business monitoring, inventory control, online shopping, and/or any other suitable functions by way of interactions with other elements of the processing system 504. According to some example embodiments, the database application communicates with the DBMS over one or more interfaces provided by the DBMS. The database application may, in turn, support client applications executed by client devices.

The DBMS may comprise any suitable system for managing a database instance. Generally, the DBMS may receive requests for data (e.g., SQL requests from the database application), may retrieve requested data from the database and may return the requested data to a requestor. The DBMS may also perform start-up, logging, recovery, management, optimization, monitoring, and other database-related tasks.

Certain embodiments are described herein as including logic or a number of components, modules, or mechanisms. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
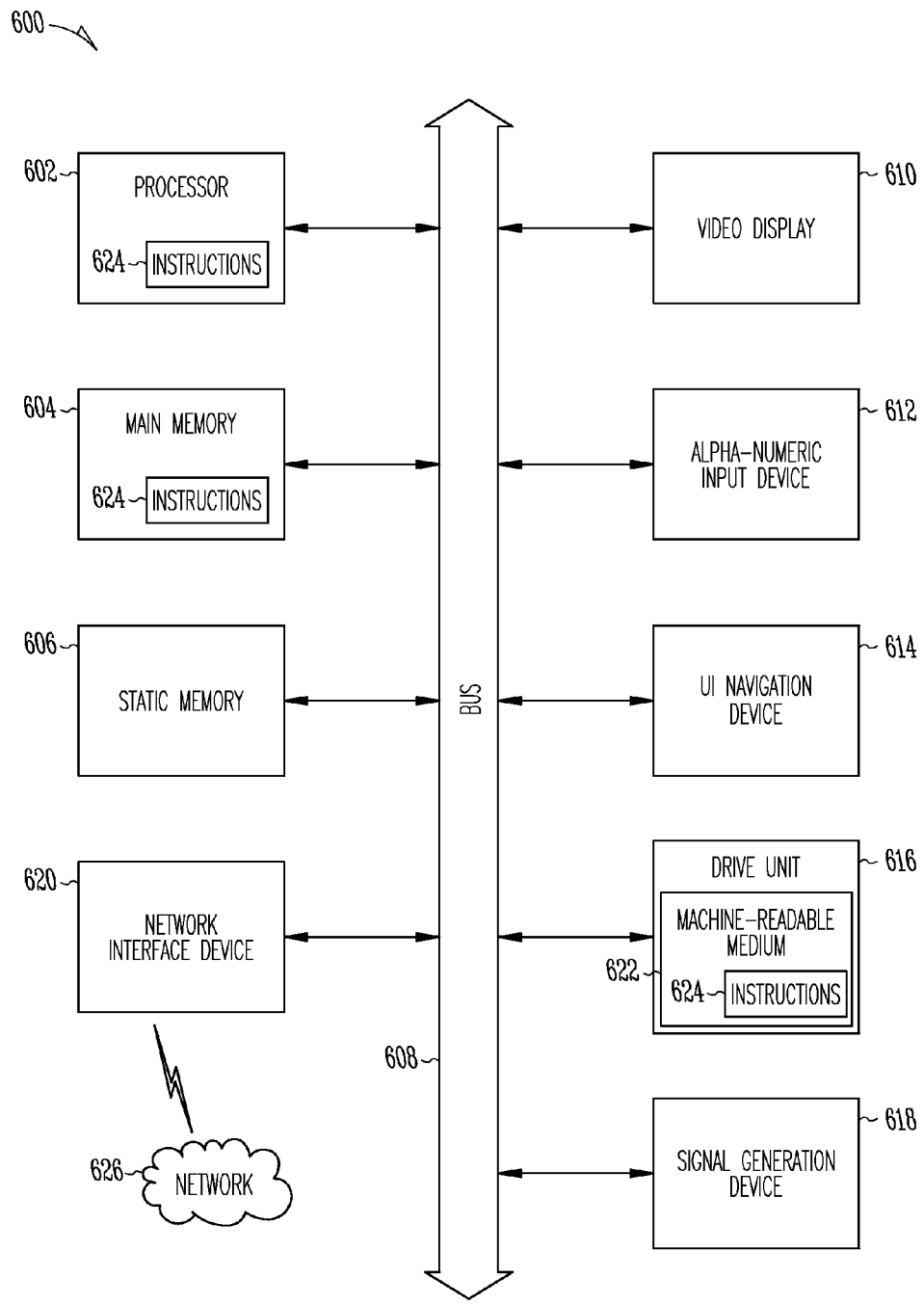
FIG. 6 is a block diagram of a computer processing system within which a set of instructions that cause the system perform any one the methodologies discussed herein may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although only certain embodiments have been described in detail above, those skilled in the art will readily appreciate that many modifications are possible without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A method of operating on database queries, comprising:
receiving values that specify a parameterized input query in a first database query language, wherein the parameterized input query includes one or more parameters that are assigned values that specify an input query in the first database query language;
determining, by using a processor, a plurality of randomized input queries in the first database query language by substituting a selection of random parameter values for the one or more parameters in the parameterized input query, wherein for each randomized input query a corresponding random-argument list identifies the one or more random parameter values for the one or more parameters;
determining a plurality of randomized output queries in a second database query language by translating the randomized input queries in the first database query language into corresponding randomized output queries in the second database query language, wherein for each randomized output query the random-argument list of a corresponding randomized input query identifies the one or more random parameter values for the one or more parameters;
determining from the randomized output queries a plurality of filtered output queries in the second database query language by replacing each occurrence of the one or more parameter values in the random-argument lists with a parameter placeholder, wherein for each filtered output query a corresponding parameter-order list identifies a corresponding parameter for each parameter placeholder; and
selecting a representative filtered output query from the filtered output queries by evaluating a likelihood of the representative filtered output query relative to the filtered output queries, wherein the representative filtered output query defines a parameterized output query in the second database query language and its parameter-order list identifies a corresponding one or more parameters that are assigned values to execute the parameterized output query in the second database query language.

2. The method of claim 1, wherein
the parameterized input query corresponds to a first access control mode for a user, and
the one or more parameters include a first parameter that is a generic parameter for the parameterized input query and a second parameter that corresponds to a privilege of the first access control mode for the parameterized input query.

3. The method of claim 1, wherein the first database query language is a Domain Specific Language (DSL) and the second database query language is a Structured Query Language (SQL).

4. The method of claim 3, wherein the DSL is an extension of an ActiveRecord query language from a Ruby on Rails Framework.

5. The method of claim 1, wherein the parameterized output query has a parameter range in the second database query language that is equivalent to a parameter range of the parameterized input query in the first database query language.

6. The method of claim 1, wherein evaluating the likelihood of the representative filtered output query relative to the filtered output queries includes determining that a threshold number of the filtered output queries correspond to the representative filtered output query.

7. The method of claim 1, wherein each parameter of the one or more parameters has a corresponding parameter type that defines a range of parameter values, and the method further comprises:
generating the selection of random parameter values for each parameter by randomizing over a corresponding range of parameter values.

8. The method of claim 1, further comprising:
saving a query record in a cache, wherein the query record relates the parameterized input query to the parameterized output query.

9. The method of claim 1, further comprising:
constructing the parameterized output query for a database;
saving a query record in a cache associated with the database, wherein the query record relates the parameterized output query to the constructed parameterized output query for the database.

10. The method of claim 1, further comprising:
executing the parameterized output query in a database with a specification for the one or more parameter to determine an executed-query result; and
saving a query record in a cache associated with the database, wherein the query record relates the parameterized output query and the specification for the one or more parameters to the executed-query result.

11. The method of claim 1, wherein the one or more parameters includes a first parameter that is a list-valued parameter, and the method further comprises:
replacing a parameter placeholder that corresponds to the list-valued parameter in the parameterized output query with a sequence of parameter placeholders corresponding to a size of the list-valued parameter.

12. A computer-readable storage medium that stores a computer program for operating on database queries, wherein the computer program includes instructions that, when executed by a computer, cause the computer to perform operations comprising:
receiving values that specify a parameterized input query in a first database query language, wherein the parameterized input query includes one or more parameters that are assigned values that specify an input query in the first database query language;
determining a plurality of randomized input queries in the first database query language by substituting a selection of random parameter values for the one or more parameters in the parameterized input query, wherein for each randomized input query a corresponding random-argument list identifies the one or more random parameter values for the one or more parameters;
determining a plurality of randomized output queries in a second database query language by translating the randomized input queries in the first database query language into corresponding randomized output queries in the second database query language, wherein for each randomized output query the random-argument list of a corresponding randomized input query identifies the one or more random parameter values for the one or more parameters;
determining from the randomized output queries a plurality of filtered output queries in the second database query language by replacing each occurrence of the one or more parameter values in the random-argument lists with a parameter placeholder, wherein for each filtered output query a corresponding parameter-order list identifies a corresponding parameter for each parameter placeholder; and selecting a representative filtered output query from the filtered output queries by evaluating a likelihood of the representative filtered output query relative to the filtered output queries, wherein the representative filtered output query defines a parameterized output query in the second database query language and its parameter-order list identifies a corresponding one or more parameters that are assigned values to execute the parameterized output query in the second database query language.

13. The computer-readable storage medium of claim 12, wherein the parameterized input query corresponds to a first access control mode for a user, and the one or more parameters include a first parameter that is a generic parameter for the parameterized input query and a second parameter that corresponds to a privilege of the first access control mode for the parameterized input query.

14. The computer-readable storage medium of claim 12, wherein the first database query language is a Domain Specific Language (DSL) and the second database query language is a Structured Query Language (SQL).

15. The computer-readable storage medium of claim 14, wherein the DSL is an extension of an ActiveRecord query language from a Ruby on Rails Framework.

16. The computer-readable storage medium of claim 12, wherein the parameterized output query has a parameter range in the second database query language that is equivalent to a parameter range of the parameterized input query in the first database query language.

17. The computer-readable storage medium of claim 12, wherein evaluating the likelihood of the representative filtered output query relative to the filtered output queries includes determining that a threshold number of the filtered output queries correspond to the representative filtered output query.

18. The computer-readable storage medium of claim 12, wherein each parameter of the one or more parameters has a corresponding parameter type that defines a range of parameter values, and the computer program further includes instructions that, when executed by the computer, cause the computer to perform operations comprising:

generating the selection of random parameter values for each parameter by randomizing over a corresponding range of parameter values.

19. The computer-readable storage medium of claim 12, wherein the computer program further includes instructions that, when executed by the computer, cause the computer to perform operations comprising:

saving a query record in a cache, wherein the query record relates the parameterized input query to the parameterized output query.

20. The computer-readable storage medium of claim 12, wherein the computer program further includes instructions that, when executed by the computer, cause the computer to perform operations comprising:

constructing the parameterized output query for a database;

saving a query record in a cache associated with the database, wherein the query record relates the parameterized output query to the constructed parameterized output query for the database.

21. The computer-readable storage medium of claim 12, wherein the computer program further includes instructions that, when executed by the computer, cause the computer to perform operations comprising:

executing the parameterized output query in a database with a specification for the one or more parameter to determine an executed-query result; and saving a query record in a cache associated with the database, wherein the query record relates the parameterized output query and the specification for the one or more parameters to the executed-query result.

22. The computer-readable storage medium of claim 12, wherein the one or more parameters includes a first parameter that is a list-valued parameter, and the computer program further includes instructions that, when executed by the computer, cause the computer to perform operations comprising:

replacing a parameter placeholder that corresponds to the list-valued parameter in the parameterized output query with a sequence of parameter placeholders corresponding to a size of the list-valued parameter.

23. An apparatus to operate on database queries, the apparatus comprising:

a processor;

memory connected to the processor and storing computer-executable modules including:

an input-query specification module configured to receive values that specify a parameterized input query in a first database query language, wherein the parameterized input query includes one or more parameters that are assigned values that specify an input query in the first database query language;

an input-query randomization module configured to determine a plurality of randomized input queries in the first database query language by substituting a selection of random parameter values for the one or more parameters in the parameterized input query, wherein for each randomized input query a corresponding random-argument list identifies the one or more random parameter values for the one or more parameters;

an output-query randomization module configured to determine a plurality of randomized output queries in a second database query language by translating the randomized input queries in the first database query language into corresponding randomized output queries in the second database query language, wherein for each randomized output query the random-argument list of a corresponding randomized input query identifies the one or more random parameter values for the one or more parameters;

an output-query filtering module configured to determine from the randomized output queries a plurality of filtered output queries in the second database query language by replacing each occurrence of the one or more parameter values in the random-argument lists with a parameter placeholder, wherein for each filtered output query a corresponding parameter-order list identifies a corresponding parameter for each parameter placeholder; and a filtered-output selection module configured to select a representative filtered output query from the filtered output queries by evaluating a likelihood of the representative filtered output query relative to the filtered output queries, wherein the representative filtered output query defines a parameterized output query in the second database query language and its parameter-order list identifies a corresponding one or more parameters that are assigned values to execute the parameterized output query in the second database query language.

24. The apparatus of claim 23, wherein
the parameterized input query corresponds to a first access control mode for a user, and
the one or more parameters include a first parameter that is a generic parameter for the parameterized input query and a second parameter that corresponds to a privilege of the first access mode for the parameterized input query.

25. The apparatus of claim 23, wherein the first database query language is a Domain Specific Language (DSL) and the second database query language is a Structured Query Language (SQL).

26. The apparatus of claim 23, wherein the DSL is an extension of an ActiveRecord query language from a Ruby on Rails Framework.

27. The apparatus of claim 23, wherein the parameterized output query has a parameter range in the second database query language that is equivalent to a parameter range of the parameterized input query in the first database query language.

28. The apparatus of claim 23, wherein evaluating the likelihood of the representative filtered output query relative to the filtered output queries includes determining that a threshold number of the filtered output queries correspond to the representative filtered output query.

29. The apparatus of claim 23, wherein
each parameter of the one or more parameters has a corresponding parameter type that defines a range of parameter values, and
the input-query randomization module is further configured to generate the selection of random parameter values for each parameter by randomizing over a corresponding range of parameter values.

30. The apparatus of claim 23, wherein the filtered-output selection module is further configured to save a query record in a cache, wherein the query record relates the parameterized input query to the parameterized output query.

31. The apparatus of claim 23, wherein the filtered-output selection module is further configured to
construct the parameterized output query for a database, and
save a query record in a cache associated with the database, wherein the query record relates the parameterized output query to the constructed parameterized output query for the database.

32. The apparatus of claim 23, wherein the filtered-output selection module is further configured to
execute the parameterized output query in a database with a specification for the one or more parameter to determine an executed-query result, and
save a query record in a cache associated with the database, wherein the query record relates the parameterized output query and the specification for the one or more parameters to the executed-query result.

33. The apparatus of claim 23, wherein
the one or more parameters includes a first parameter that is a list-valued parameter, and
the filtered-output selection module is further configured to replace a parameter placeholder that corresponds to the list-valued parameter in the parameterized output query with a sequence of parameter placeholders corresponding to a size of the list-valued parameter.

* * * * *